March 31, 1964
V. E. BECKHAM
3,127,042
BOAT TRAILER
Filed Oct. 16, 1962
2 Sheets-Sheet 1
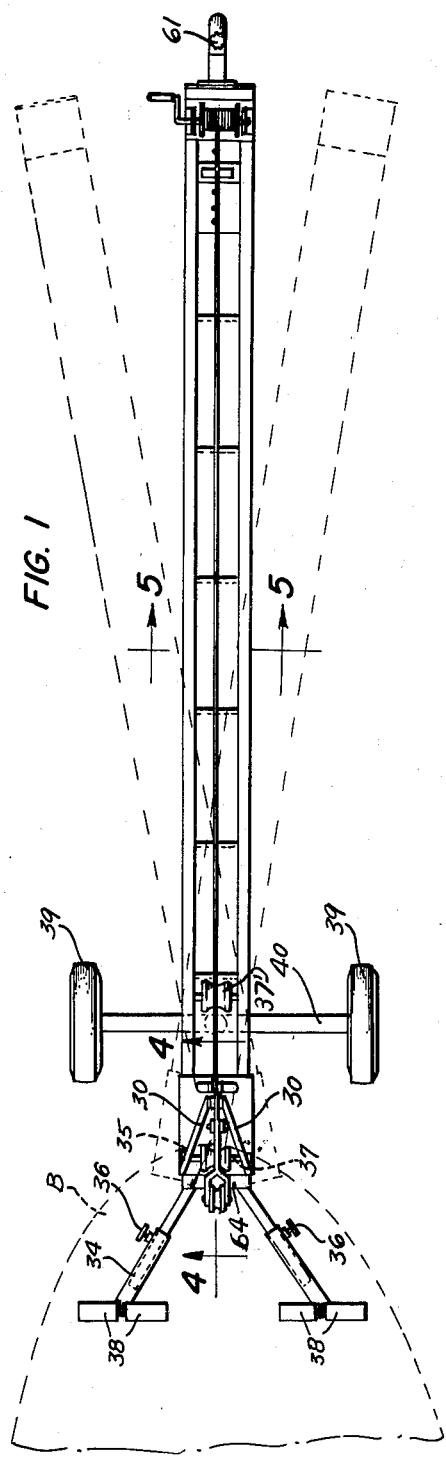
INVENTOR
*Virgil E. Beckham*

March 31, 1964   V. E. BECKHAM   3,127,042
BOAT TRAILER
Filed Oct. 16, 1962   2 Sheets-Sheet 2
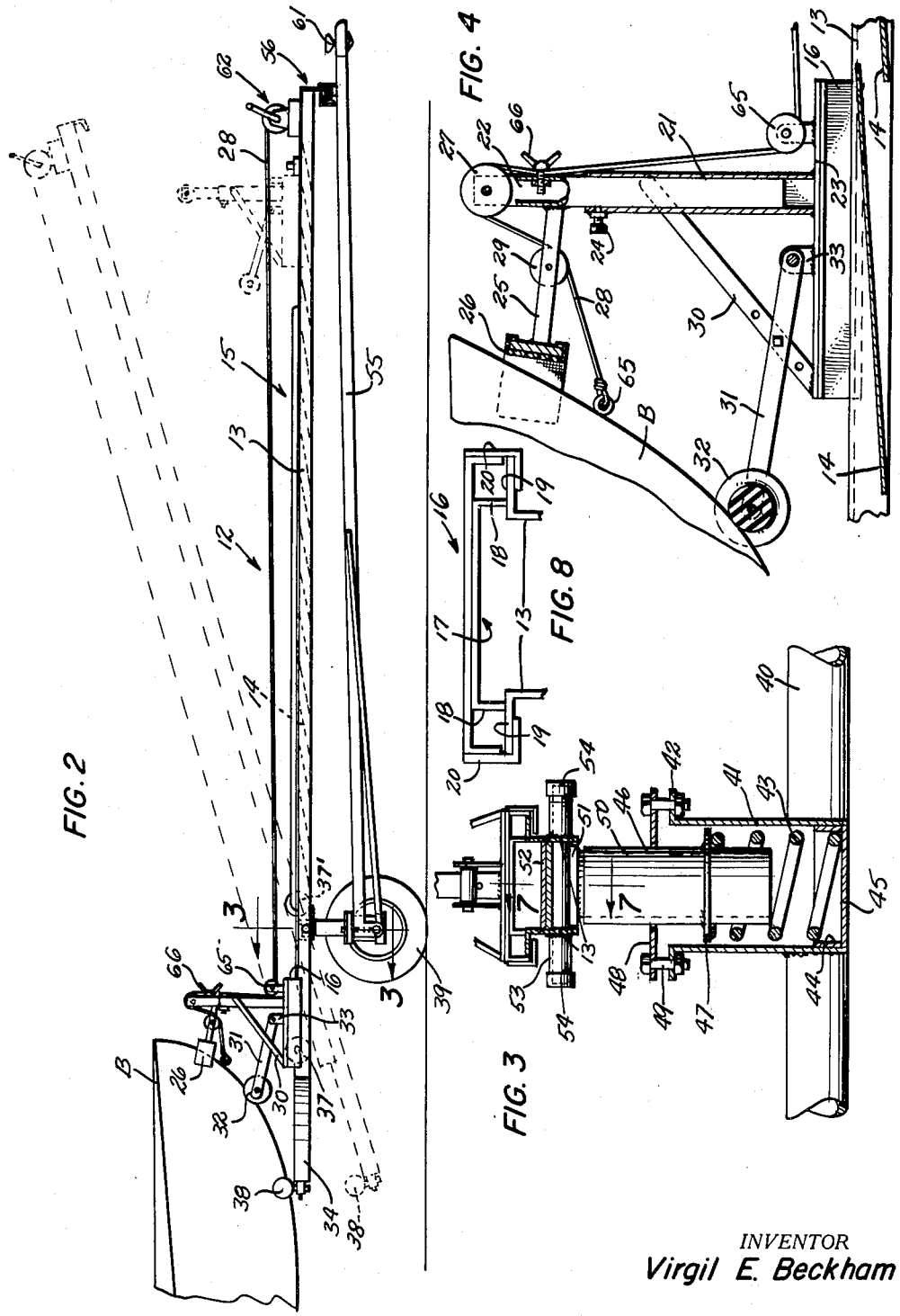
INVENTOR
Virgil E. Beckham United States Patent Office 3,127,042
Patented Mar. 31, 1964

3,127,042
BOAT TRAILER
Virgil E. Beckham, 1612 Crockett Ave., Victoria, Tex.
Filed Oct. 16, 1962, Ser. No. 230,942
4 Claims. (Cl. 214—505)

This invention relates to vehicles and more particularly to that vehicle known as a boat trailer.

Boat trailers are vehicles especially designed to be attached to the back of a passenger automobile or a truck. They are designed to carry a boat to wherever one may want to place the same in the water.

Boat trailers vary according to the size of the boat for which they are built. The method by which the boat is loaded upon the trailer and the number of people required for this work will also affect the design of the trailer.

While there are any number of good boat trailers on the market, most of them fail completely when it comes to the case in which one can load a boat onto the same. This is particularly true of the so-called one-man trailers whereby one man is supposed to be able to load a boat onto the trailer without additional help.

It is, therefore, an object of this invention to provide a boat trailer having a loading device that will quickly and effectively permit one person to load a boat onto its bed.

Another object of this invention is to provide a boat trailer that is an improvement over that boat trailer which was granted U.S. Patent No. 2,937,776 to this inventor.

Another object of this invention is to provide a boat trailer that works equally as well with a light or heavy load.

Another object of this invention is to provide a boat trailer having a loading device that hauls the boat up onto the same in an upright position.

Another object of this invention is to provide a boat trailer that has an adjustable loading and unloading sled that firmly grasps the bow of any size of boat and pulls the same from the rear to the front of the trailer by means of a hand operated winch located on the front end of the trailer.

Still another object of this invention is to provide a boat trailer having a loading and unloading device that eliminates the need for rollers, which corrode on coming in contact with salt water.

Other and further objects and advantages of this boat trailer will be hereinafter described, and the novel features thereof defined in the appended claims.

Referring to the drawing:

FIGURE 1 is a top view of the invention.

FIGURE 2 is a side view of this invention.

FIGURE 3 is a sectional view of this invention, taken substantially along line 3—3 of FIGURE 2, as viewed in the direction indicated by the arrows.

FIGURE 4 is a sectional view of this invention, taken substantially along line 4—4 of FIGURE 1, as viewed in the direction indicated by the arrows.

FIGURE 5 is a sectional view of this invention, taken substantially along line 5—5 of FIGURE 1, as viewed in the direction indicated by the arrows.

FIGURE 6 is an enlarged view of that portion of this invention that is shown in end view in FIG. 5 and indicated by the numeral 56 on FIGURE 2.

FIGURE 7 is a sectional view of this invention, taken substantially along line 7—7 of FIGURE 3, as viewed in the direction indicated by the arrows.

FIGURE 8 is an end view of the sled portion of this invention, showing it mounted on the trailer.

Similar reference characters refer to similar parts throughout the several views of the drawing.

Having reference now to the drawing in detail, there is generally indicated by the character 12 a boat trailer comprising a pair of steel beams 13 secured together in parallel spaced relation to each other by a plurality of equally spaced rectangular plates 14, set at the angle best shown in FIGURE 2 of the appended drawing.

The aforesaid steel beams 13 each have a configuration of an inverted capital letter L when viewed from the end. The beams, which I personally call a track, provide the bed 15 for the loading and unloading sled 16 which has an end-viewed configuration of an inverted letter U and which is provided with an inside supporting member 17 that also has end-viewed configuration of an inverted letter U having its vertical portions 18 hold the aforesaid sled 16 above the track by reason of their resting on the upper surface 19 of the aforesaid steel beams 13. The channel members 20 of the sled 16 prevent the sled 16 from coming off the track, as can be fully understood by examination of FIGURE 8 of the drawing. A hollow steel post 21 having a tubular member 22 is vertically secured to the upper surface 23 of the sled 16. The aforesaid tubular member 22 is adjustably secured within the upper end of the hollow steel post 21 by means of adjusting screw 24. A horizontally disposed boat support member 25, having a U-shaped boat holder 26 on the outer end thereof, is suitably secured to the upper end of the aforesaid tubular member 22, which provides rotatable support for the pulley 27 over which is placed the cable 28 that passes under pulley 29, which is rotatably mounted on one side of the already mentioned boat support member 25. The hollow steel post 21 is supported in part and additionally braced by the pair of diagonal members 30 that have their lower end firmly fixed to the top of the sled 16. An intermediate member 31, having a boat support roller 32 mounted on the outer end thereof, is swingably secured to the aforesaid sled 16 by means of a lug 33. The purpose of the aforesaid member 31 is, of course, to provide additional support to the bow of any boat that may be placed on this novel trailer. A pair of bottom support members 34 extend outward and backward from the center of the aforesaid bed 15 of the track where they are secured to a block 64, by any suitable means such as welding. The block 64 is secured to the ends of bed 15 by any suitable means such as welding. Thus the support members 34 extend in substantially the same plane as bed 15. This is shown in full lines and also in phantom lines in FIG. 2. The pair of bottom support members 34 have the configuration of a letter V when viewed from the top. Each one of the aforesaid bottom support members 34 is made in two separate beams telescoping one into the other and adjustably secured longitudinally by an adjusting screw 36, as clearly shown in FIGURE 1 of the appended drawing. Members 34 are provided with boat pads 38 on their rearmost end. Rubber rollers 37 and 37' are rotatably secured to bed 15 by suitable bearings and shafts such as shaft 35 for roller 37. These rollers guide the boat as it is loaded on the trailer.

A pair of boat trailer support wheels 39 are suitably mounted one on each end of the axle 40 which forms a part of the carriage for the aforesaid boat trailer, that is mounted underneath the aforesaid bed 15 of the track by means of a centrally located hollow post 41 having a flange 42 on the upper end thereof. A coil spring 43 is located within the post and rests on a positioning ring 44 and a bottom plate 45. A tube 46 extends upward from the center of the coil spring 43 on which it rests by means of a tube support collar 47, as one can see on examination of FIGURE 3 of the appended drawing, where it is also seen that the tube is further held in place by a ring 48 having a centrally located opening through which the tube 46 is slidably mounted. The ring 48 is bolted to the flange 42 of the hollow post 41 by a plurality of equally and radially spaced bolts 49. A pin 50 is placed within the tube 46. The top of the pin has a plate 51 welded thereon. An inverted U-shaped member 52 is secured to the aforesaid plate 51. The ends of the inverted U-shaped member 52 are secured to the inside of each one of the aforesaid steel beams 13, thereby providing a cushioned and pivotable support for the bed of this boat trailer by means of the hollow shaft 53, which has a cap 54 screwed on each end thereof.

A longitudinal stringer 55 extends from the axle 40 to the forward end 56 of the bed of this unique boat trailer where it supports an L-shaped member 57 having an opening through which vertically passes a spring loaded bolt 58 which also passes through an L-shaped member 59 and the inverted L-shaped member 60. The L-shaped member 59 is secured to the front ends of the pair of steel beams 13, thereby providing a front end support for this portion of the boat trailer 12 which is normally secured to the rear end of a vehicle by means of any suitable towing hitch 61. The just described front end construction of this boat trailer obviously provides a new and unusual spring cushioned method boat trailer construction that has never been used before. The removal of the aforesaid spring loaded bolt 58 from the L-shaped members permits the front end of the boat trailer to be tipped upward, as shown by phantom lines in FIGURE 1 of the appended drawing, thereby facilitating the loading and unloading of any boat without the use of rollers. A hand operated winch 62, having a drum 63, on which is wound the already mentioned cable 28, is suitably mounted on the front end of the steel beams 13. The aforesaid cable 28 is the same one which was previously described as passing up over pulley 27 and under pulley 29 that are mounted on the sled 16. The free end of the cable 28 is removably secured to the bow of the boat by means of a suitable attachment 65.

It is obvious from the above described construction of this novel boat trailer, which has been given in detail, with the exception of some of the minor items such as bearings, bolts, and the like, that a boat having its bow as shown in phantom lines in FIGURE 1, and in full lines in FIGS. 2 and 4 of the appended drawings, is loaded on this invention merely by one man removing the spring loaded bolt 58 from the front end of the trailer and then tipping its bed upward until the pads 38 of the supports 34 are in the position shown in phantom lines in FIG. 2. The sled 16 has been placed at the rear end of the bed by releasing the hand operated winch 62 and letting gravity take the sled 16 back to the end of the trailer when the bed is tipped upward. The boat herein characterized for the first time by the capital letter B is now floated or pulled onto the aforesaid pads 38. Cable 28 is secured to attachment 65. The winch is used to pull the end of the boat into position with respect to V-shaped boat holder 26 and boat support roller 32, which position is shown in FIG. 4. The cable holding screw 66 is tightened thus holding the cable in place so that it, the cable, will not only hold the boat B in place on the boat support roller 32 and pads 38 but will also provide a means of permitting the sled 16 to be drawn up to the forward end 56 of the boat trailer 13 by the hand operated winch 62, as has been previously described.

From the foregoing it will now be seen that there is herein provided a boat trailer which accomplishes all of the objects of this invention, and others, including many advantages of great practical utility and commercial importance.

As many embodiments may be made of this inventive concept, and as many modifications may be made in the embodiment hereinbefore shown and described, it will be understood that all matter herein is to be interpreted merely as illustrative, and not in a limiting sense.

In accordance with the provisions of the United States patent statutes, as stated in the United States Code Title 35, Patents, I have now described the principle of construction and operation of my invention of a boat trailer in the form which I personally consider the best embodiment thereof, and what I now claim as my invention and desire to secure by Letters Patent is:

1. A boat trailer of the character described, comprising a bed embodying a pair of steel beams having the configuration of an inverted capital letter L when viewed from either end, the said steel beams being together in parallel spaced relation to each other, a plurality of angularly disposed rectangular steel plates in longitudinal spaced relation to each other extending between the said steel beams and having their ends secured to the steel beams, the said bed having a sled slidably mounted thereon, the said sled comprising a pair of inverted U-shaped members one nesting inside the other, the nested inverted U-shaped members having its vertical portions resting on the horizontal members of the said steel beam, thereby supporting the said sled on the said beams, and an L-shaped member secured on each side of the said sled with the lower portion of the L extending under said horizontal portion, thereby holding the sled on the said beams, the said sled supporting a mechanism for holding the bow of a boat and a manually operated winch, mounted on the front ends of the said bed, and a pair of wheels mounted on a spring loaded carriage supporting the rear end of the said bed.

2. A boat trailer of the character described, comprising a bed embodying a pair of steel beams having the configuration of an inverted capital letter L when viewed from either end, the said steel beams being together in parallel spaced relation to each other, a plurality of angularly disposed rectangular steel plates in longitudinal spaced relation to each other extending between the said steel beams and having their ends secured to the steel beams, the said bed having a sled slidably mounted thereon, the said sled comprising a pair of inverted U-shaped members, one nesting inside the other, the nested inverted U-shaped members, having its vertical portions resting on the horizontal members of the said steel beams, thereby supporting the said sled on the said beams and an L-shaped member secured on each side of the said sled with the lower portion of the L extending under said horizontal portion, thereby holding the sled on the said beams, the said sled supporting an adjustable mechanism embodying a hollow post vertically mounted thereon, a second post telescoping into said hollow post, means for securing said second post in any adjusted position with respect to the said first post and a boat support member extending backward from the upper end of the said hollow post, a U-shaped boat holder secured to the outer end of said boat support member and an intermediate member swingably mounted on the said sled and rearward of the said hollow post, a boat support roller rotatably mounted on the outer end of the said intermediate member, a pulley secured to the upper end of said second post, a second pulley secured to said sled on the side of said hollow post opposite to said boat support, and a cable having one end removably secured to the said boat and passing through said pulleys, and a manually operated winch secured to said cable and mounted on the front ends of the said bed, and a pair of wheels mounted on a spring loaded carriage supporting the rear end of the said bed.

3. A boat trailer of the character described, comprising a bed embodying a pair of steel beams having the configuration of an inverted capital letter L when viewed from either end, the said steel beams being together in parallel spaced relation to each other, a plurality of angularly disposed rectangular steel plates in longitudinal spaced relation to each other extending between the said steel beams and having their ends secured to the steel beams, the said bed having a sled slidably mounted thereon, the said sled comprising a pair of inverted U-shaped members, one nesting inside the other, the nested inverted U-shaped member having its vertical portions resting on the horizontal members of the said steel beams, thereby supporting the said sled on the said beams, and an L-shaped member secured on each side of the said sled with the lower portion of the L extending under said horizontal portion, thereby holding the sled on the said beams, the said sled supporting an adjustable mechanism embodying a hollow post vertically mounted thereon, a second post telescoping into said hollow post, means for securing said second post in any adjusted position with respect to the said first post, and a boat support member extending backward from the upper end of the said hollow post, a U-shaped boat holder secured to the outer end of said boat support member, and an intermediate member swingably mounted on the said sled and rearward of the said hollow post, a boat support roller rotatably mounted on the outer end of the said intermediate member, a pulley secured to the upper end of said second post, a second pulley secured to said sled on the side of said hollow post opposite to said boat support, and a cable having one end removably secured to the said boat and passing through said pulleys, and a manually operated winch secured to said cable and mounted on the front ends of the said bed and a pair of wheels mounted on a spring loaded carriage supporting the rear end of the said bed, and a pair of bottom boat support members extending outward and rearward from the rear end of the said bed, a pair of pads on the outer end of each one of the said boat support members.

4. A boat trailer of the character described, comprising a bed embodying a pair of steel beams having the configuration of an inverted capital letter L when viewed from either end, the said steel beams being together in parallel spaced relation to each other, a plurality of angularly disposed rectangular steel plates in longitudinal spaced relation to each other extending between the said steel beams and having their ends secured to the steel beams, the said bed having a sled slidably mounted thereon, the said sled comprising a pair of inverted U-shaped members, one nesting inside the other, the nested inverted U-shaped member having its vertical portions resting on the horizontal members of the said steel beams, thereby supporting the said sled on the said beams and an L-shaped member secured on each side of the said sled with the lower portion of the L extending under said horizontal portion, thereby holding the sled on the said beams, the said sled supporting an adjustable mechanism embodying a hollow post vertically mounted thereon, a second post telescoping into said hollow post, means for securing said second post in any adjusted position with respect to the said first post, and a boat support member extending backward from the upper end of the said hollow post, a U-shaped boat holder secured to the outer end of said boat support member, and an intermediate member swingably mounted on the said sled and rearward of the said hollow post, a boat support roller rotatably mounted on the outer end of the said intermediate member, a pulley secured to the upper end of said second post, a second pulley secured to said sled on the side of said hollow post opposite to said boat support, and a cable having one end removably secured to the said boat and passing through said pulleys, and a manually operated winch secured to said cable and mounted on the front ends of the said bed, and a pair of wheels mounted on a spring loaded carriage supporting the rear end of the said bed, and a pair of bottom boat support members adjustable in length and extending outward and rearward from the rear end of the said bed, a pair of pads on the said pair of bottom boat support members said bottom support members having the basic configuration of the letter V when viewed from the top, the said pair of bottom boat support members being rotatably mounted on the outer end of each one of the said boat support members, a pair of pads mounted on each of said boat support members.

References Cited in the file of this patent
UNITED STATES PATENTS

| | | |
|---|---|---|
| 2,708,045 | Shontz | May 10, 1955 |
| 2,821,315 | Bucher | Jan. 28, 1958 |
| 2,915,209 | Layne | Dec. 1, 1959 |
| 2,937,776 | Beckham | May 24, 1960 |
| 2,960,246 | Lovelace | Nov. 15, 1960 |
| 3,031,093 | Holsclaw | Apr. 24, 1962 |
| 3,058,608 | Lewis | Oct. 16, 1962 |
| 3,077,998 | Balko et al. | Feb. 19, 1963 |